United States Patent [19]

Peroutky

[11] Patent Number: 4,466,770

[45] Date of Patent: Aug. 21, 1984

[54] ROBOTIC MACHINE

[75] Inventor: Donald C. Peroutky, Schenectady, N.Y.

[73] Assignee: General Electric Company, Schenectady, N.Y.

[21] Appl. No.: 551,784

[22] Filed: Nov. 14, 1983

Related U.S. Application Data

[63] Continuation of Ser. No. 294,588, Aug. 20, 1981, abandoned.

[51] Int. Cl.³ ............................................. B65G 7/00
[52] U.S. Cl. ................................... 414/751; 414/749
[58] Field of Search ................. 414/749, 751, 753, 4; 74/89.15; 248/405; 294/88

[56] References Cited

U.S. PATENT DOCUMENTS

| | | | |
|---|---|---|---|
| 3,884,363 | 5/1975 | Ajlouny | 414/751 X |
| 3,966,249 | 6/1976 | Lindquist | 294/88 |
| 3,977,262 | 8/1976 | Randolph | 74/89.15 |
| 4,005,895 | 1/1977 | Cullings | 294/88 X |
| 4,128,019 | 12/1978 | Kupka | 74/89.15 X |
| 4,188,166 | 2/1980 | Moreau et al. | 414/4 X |

Primary Examiner—Robert J. Spar
Assistant Examiner—Donald W. Underwood
Attorney, Agent, or Firm—Donald R. Campbell; James C. Davis, Jr.; Paul R. Webb, II

[57] ABSTRACT

A robotic machine used in the automatic assembly of mechanical and electrical components is configured to assemble heavy parts at high speeds and is modular; there are one to four degrees of freedom. A motor assembly machine has X, Y, and Z movable axes and a rotational movement $\theta$ about the Z axis; a gripper or tool is mounted on the lower end of the $\theta$ axis. The vertical carriage has a rigid elongated housing which is the support structure for the $\theta$ axis components.

2 Claims, 7 Drawing Figures

ROBOTIC MACHINE

This application is a continuation of application Ser. No. 294,588, filed Aug. 20, 1981, now abandoned.

BACKGROUND OF THE INVENTION

This invention relates to an industrial robotic machine which is modular and adapted to a wide variety of assembly tasks.

Robotic machines require design features that permit rapid manipulation and precise alignment of parts being handled. These characteristics dictate a configuration with lightweight moving parts having good structural rigidity. Simple, low cost construction and long operating life are essential for the machine to be economically viable. Modular configuration is desirable to permit application to a number of different assembly tasks.

Many robotic type machines exist and are in use, but most are high in cost, relatively slow in operation, handle only small parts, and do not have high positional accuracy. Some have a non-modular configuration and are not easily changed to do different tasks.

SUMMARY OF THE INVENTION

The principal objects of the invention are to provide a machine configuration which overcomes many of the limitations of existing robotic type assembly machines, permits the automatic assembly of relatively heavy parts at high operational speeds, and has a modular configuration such that each of the axes is a module independent of the other axes.

The preferred embodiment provides three movable axes and a rotational movement about one axis, typically X and Y horizontal and Z vertical plus a rotational movement $\theta$ about the Z axis. A first carriage is supported on a frame on which is mounted drive means for moving it along the Y axis. A second carriage is supported on the first carriage which has drive means for moving the second carriage linearly along the X axis. The third (Z) carriage is mounted on the second carriage and is comprised of an elongated housing such as a rigid structural tube; this configuration provides the lightweight, stiffness and long stroke characteristic necessary for high performance assembly operations. Drive means for the third carriage is carried by the second carriage and engages a non-rotatable lead screw fastened at the exterior of the housing. A rotatable plate or member is mounted approximately at one end of the elongated housing, and the rotation drive means is carried by and at least partially inside the elongated housing. The assembly tool or gripper is attached to this rotatable member.

The normally vertical Z movement can be used by itself for simple assembly tasks and with the rotation axis for more complicated tasks. Another embodiment is that the vertical Z movement is mounted on perpendicular X and Y movements to form an integrated robotic cartesian coordinate assembly machine. Machine support is provided by a four corner post stand which leaves a large unobstructed working space beneath the machine.

DESCRIPTION OF THE PREFERRED EMBODIMENTS

Figure 1:
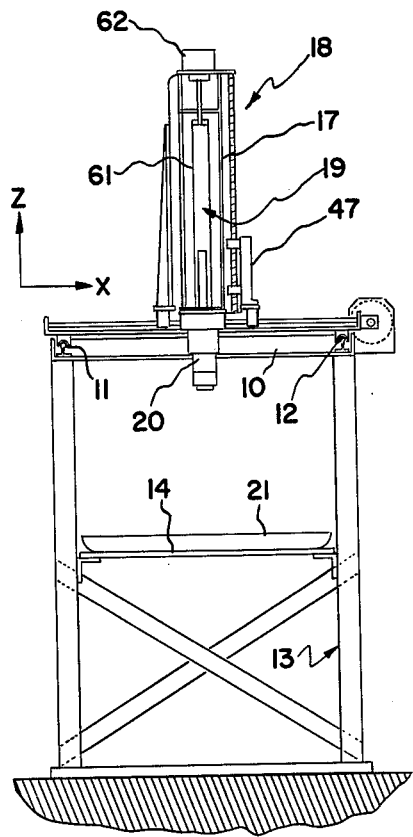
FIGS. 1-3 are front, side, and top views, partly in section, of an automatic motor assembly machine with four axes of movement.
Figure 2:
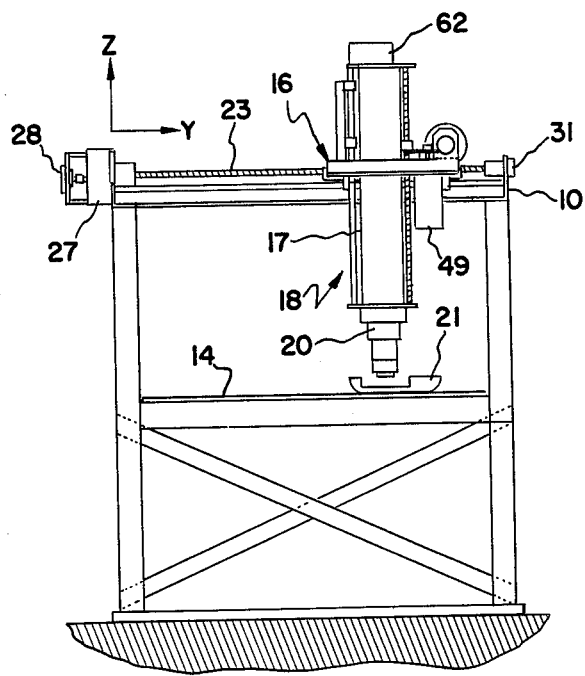
Figure 3:
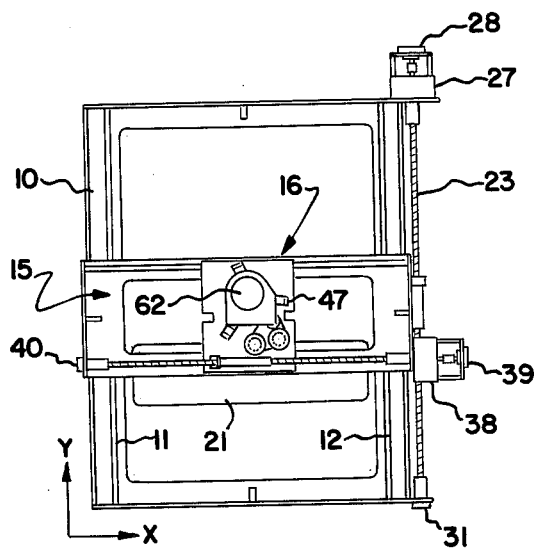

The line sketches in FIGS. 1-3 of the cartesian coordinate robotic mechanism show its general configuration, mounting framework, and location with respect to an assembly table as may be required for a specific application. Two horizontal and one vertical linear coordinate axes, plus a rotation axis colinear with the vertical movement, are provided by the mechanism. The robotic machine configuration permits overhead location with respect to conveyor lines and assembly areas to conserve floor space. Any one or all of the four degrees of freedom provided by the mechanism can be used as required for a specific assembly operation. The payload capability, speed of operation, and position resolution make this mechanism readily adaptable to assembly operations on large or small products of similar types.

The rectangular machine support frame 10 is constructed from flat aluminum die plate stock with peripheral right angle reinforcement, and has a large center cutout. Along two sides of the frame 10 are Y axis way rods 11 and 12 which support all moving machine elements. A braced four corner post stand 13 has one leg at each corner of the support frame 10 and is provided to hold both the robotic machine and the horizontal assembly table 14 in rigid alignment with an obstruction-free work region.

A long Y-axis carriage 15 and a short X-axis carriage 16 are of aluminum flat plate construction with peripheral right angle structural reinforcement, and an elongated housing such as cylindrical aluminum tube 17 is used for the Z-axis carriage 18. All carriages, which have mutualy perpendicular linear movements, are supported on round steel way rods with linear ball bearings. This configuration provides the structural stiffness required for high speed servo operation. The $\theta$-axis components, indicated generally at 19, are mounted on and within the Z housing 17. A suitable gripper 20 (the robot "hand") or part handling mechanism is normally mounted on the lower end of the $\theta$ axis to accomplish useful assembly tasks. In FIGS. 1 and 2 the vertical carriage 18 is shown in the maximum up and down positions; in the latter the gripper 20 is over a parts tray 21. The large center cutout in support frame 10 (FIG. 3) permits the Z-axis carriage to move vertically within the horizontal limits of the Y and X axes displacements.

Figure 4:
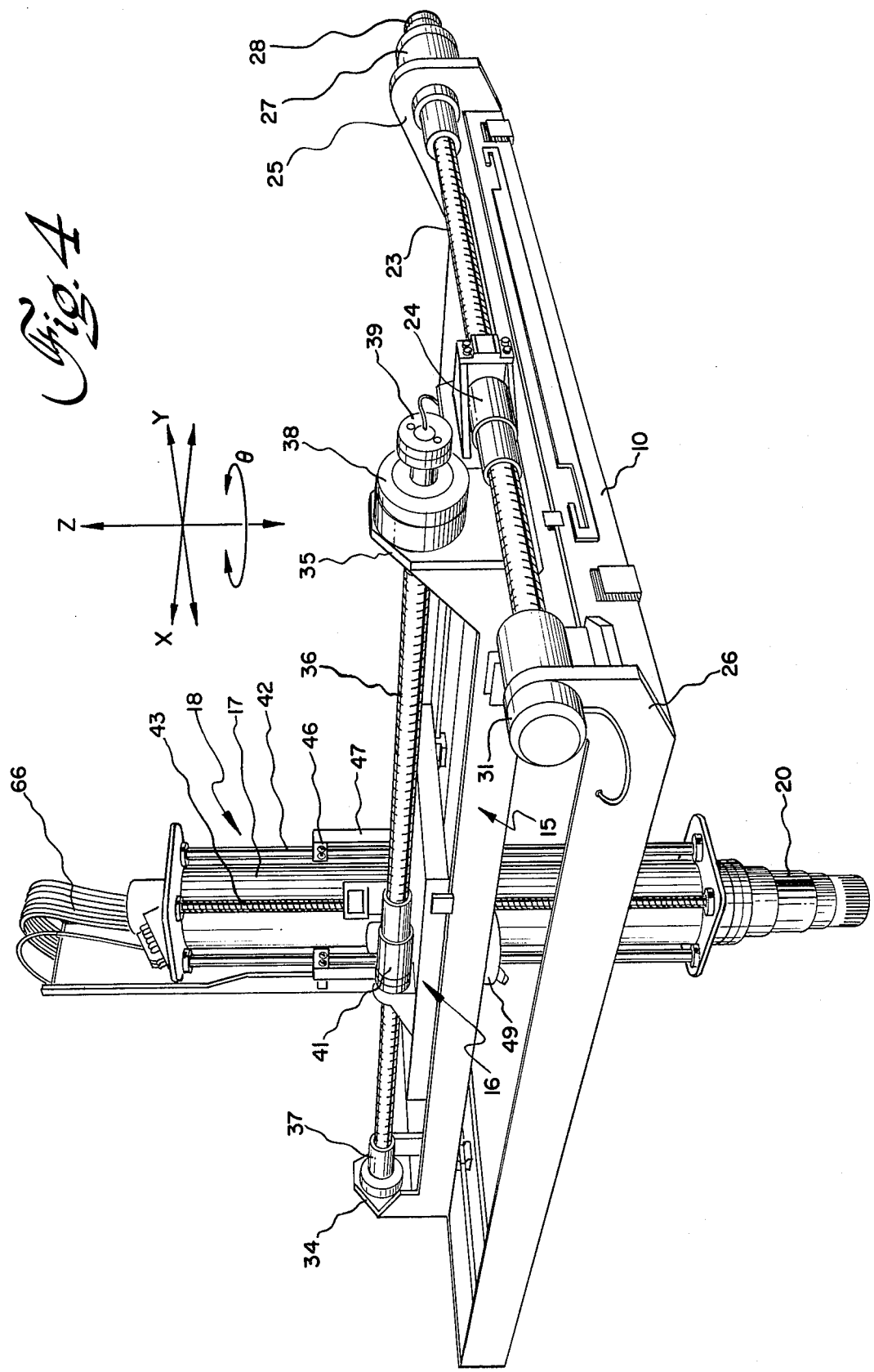
FIG. 4 is a perspective view of the horizontal (X and Y) and vertical (Z) carriages and supporting framework and drives.
Figure 5:
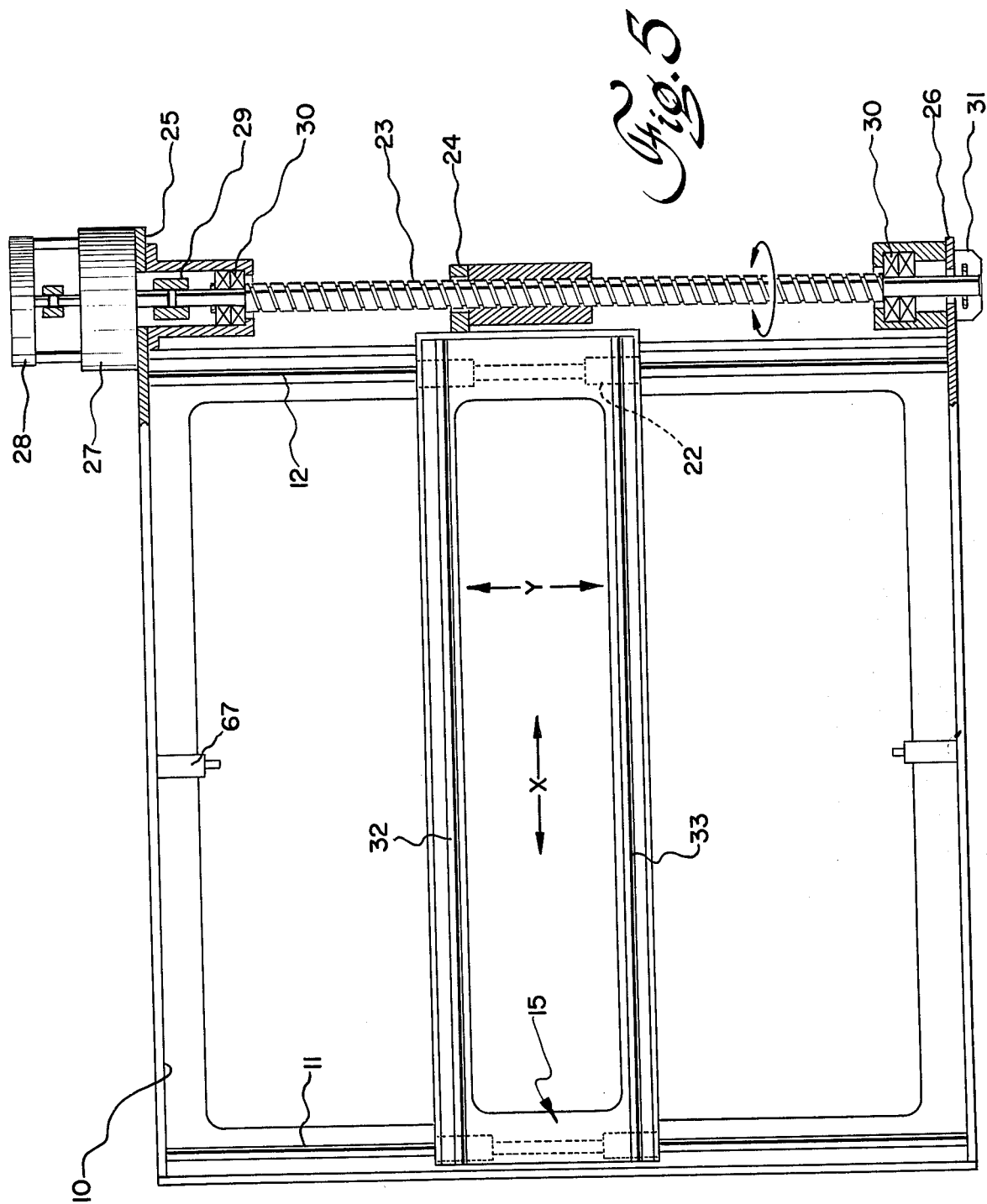
FIG. 5 is a schematic plan view of the support frame and Y-axis carriage and, in cross section, the Y drive components.

Referring to FIGS. 4 and 5, the construction of rectangular Y-axis carriage 15 is similar to frame 10 and there is a large unobstructed central area. Ball bushings 22 are attached to the bottom surface of carriage 15 and ride on the way rods 11 and 12. Carriage driving force is provided through a motor driven lead screw 23 to a preloaded ball bearing nut 24 attached to the framework of carriage 15. The Y-axis drive components are supported at one side of frame 10 and are mounted between two brackets 25 and 26. The Y drive motor 27 is secured to bracket 25 and has an associated tachometer 28. The motor shaft is connected through a flex coupling 29 to an end of lead screw 23, and both ends of the lead screw are supported by rigid double bearings 30 which are mounted on brackets 25 and 26. A rotary incremental encoder 31 is at the end of lead screw 23 and senses the axis position.

The configurations of the horizontal X and Y axes are similar. The Y-axis carriage 15 has two parallel way rods 32 and 33 on which ride ball bushings attached to the lower surface of the X-axis carriage 16. The X drive components are mounted on the Y-axis carriage 15 between brackets 34 and 35 and include the lead screw 36, bearings 37, drive motor 38, and tachometer 39. The X encoder 40 is seen in FIG. 3. A preloaded ball nut 41 attached to carriage 16 moves this carriage along the X-axis in response to rotation of lead screw 36. Notice that each horizontal movement can be used by itself, or both can be used as a coupled pair to form a working machine. The foregoing machine configuration provides the lightweight and structural rigidity to permit, in a programmed assembly machine that was built, operational carriage accelerations of 0.5 g, carriage speeds to 40 inches/sec, and positional accuracy of 0.001 inch.

Figure 6:
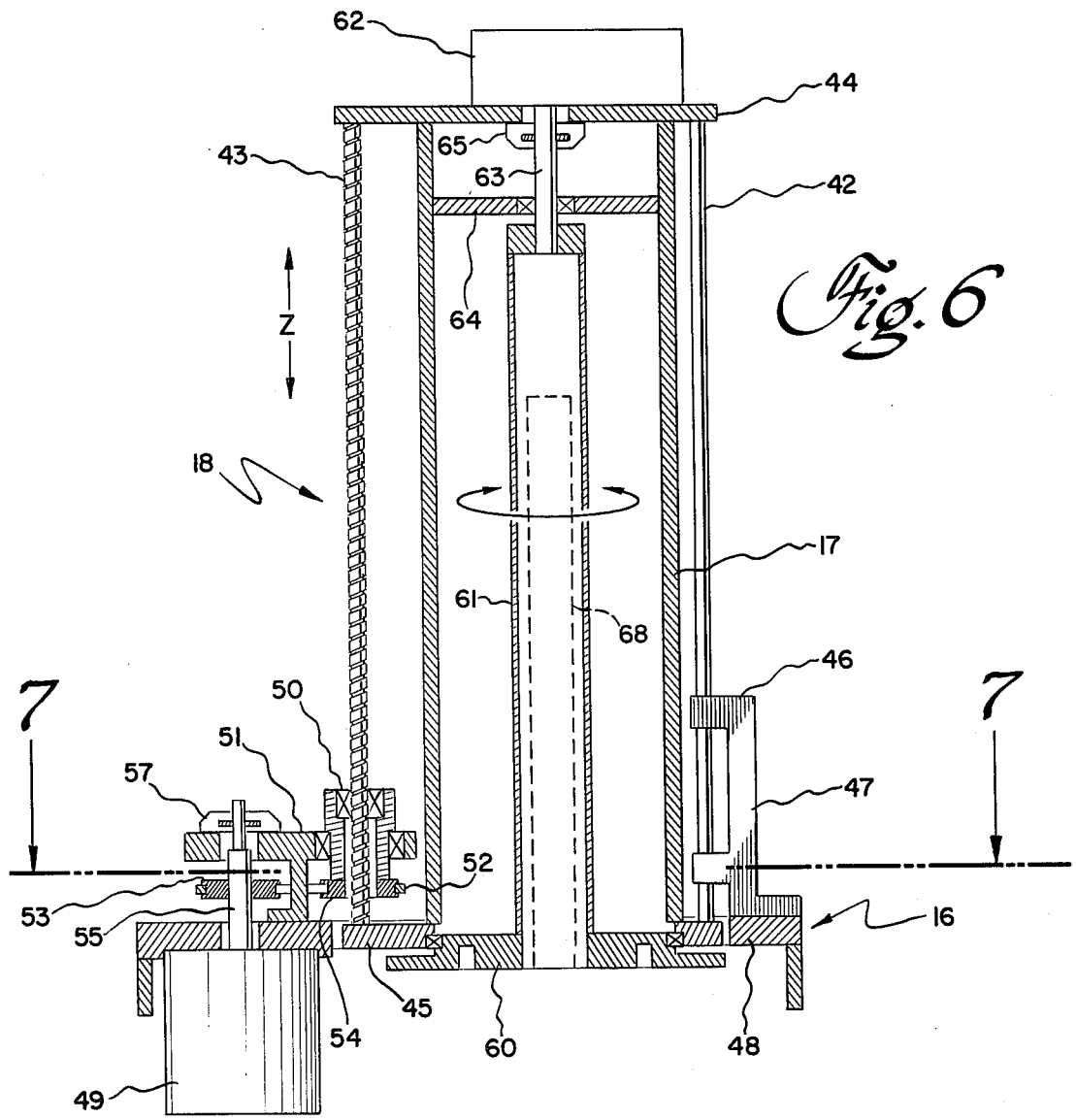
FIG. 6 is a vertical cross section through the vertically moving (Z) carriage and the drive components and one horizontal carriage.
Figure 7:
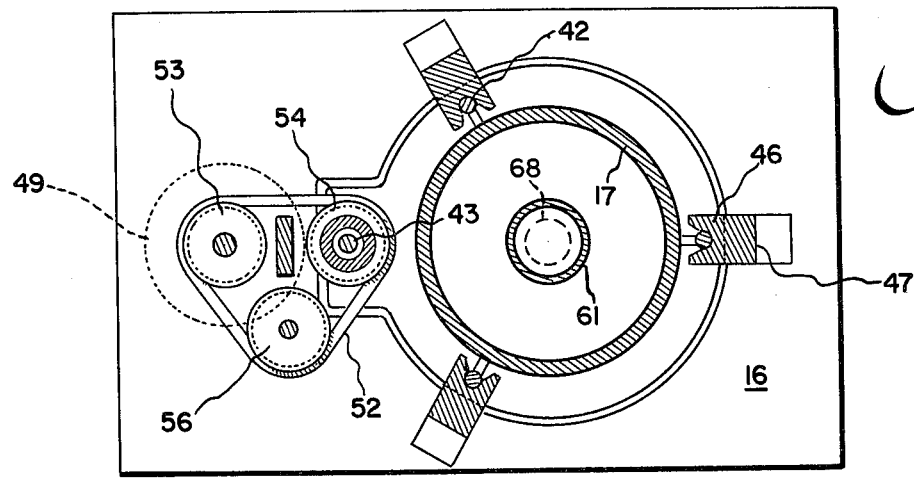
FIG. 7 is a cross section taken approximately on line 7—7 in FIG. 6.

FIGS. 6 and 7 show the general design configuration of the vertical and rotation axes. The simple structural tube 17 provides a rigid form for supporting three way rods 42 and a non-rotating lead screw 43. End plates 44 and 45 are attached to either end of the rigid structural tube 17 and the way rods and lead screw are fastened between these end plates. Ball bushings 46 are rigidly supported on uprights 47 that are in turn attached to the X carriage base plate 48; alternatively the bushings or other linear bearings are on housing 17 and the way rods are mounted on the X carriage base plate. With this construction the vertical movement of Z carriage 18 is precisely guided. Carriage motion is provided by a motor 49 which rotates a lead screw ball nut 50 to move the lead screw 43 and attached carriage 18. The rotating ball nut 50 is mounted on a bracket 51 attached to the X base plate 48, and the Z drive motor 49 is mounted on the lower surface of the base plate. A timing belt 52 engages pulleys 53 and 54 on the motor drive shaft 55 and on the ball nut 50, and is used to provide a positive drive coupling from the motor 49 to the lead screw nut 50. Belt 52 also drives a tension adjustment pulley 56 with a fail-safe brake such as Electroid Corp. model FSB-7-6; this is a rotary brake and locks the vertical movement of carriage 18 when driving power is removed. This prevents the Z-axis carriage from falling by gravity force to its full down position in the event of power failure. A Z encoder 57 is mounted directly on the drive motor shaft 55 and senses the position of the Z axis. The structural tubular configuration of the vertical carriage 18 provides the lightweight, stiffness, and long stroke characteristics necessary for high performance assembly machine operation.

The housing structural tube 17 which acts as the backbone for the vertical axis is also the support structure for the rotational or $\theta$ axis. A rotation plate 60 at the lower end of tube 17 has a central hole and is bearing supported on end plate 45 and driven, through a hollow shaft 61, by a rotation drive motor 62 at the top of the tube. Motor 62 is mounted on end plate 44 and the motor shaft 63, which is aligned with the axis of tube 17, is centered by a bearing on partition 64 and is attached to drive tube 61. The rotation encoder 65 is mounted directly on motor shaft 63. This configuration provides for a rotation plate or member 60 with an unobstructed region for holding assembly tooling required by the robotic machine to perform machine assembly tasks. The hollow rotation drive shaft 61 is particularly advantageous when used to accommodate long pneumatic and hydraulic cylinders 68 which are frequently used for specific assembly operations. When a part is picked up and then rotated, as is done during assembly of a small motor, the entire Z carriage 18 is not rotated, but only the plate 60 and attached gripper by motor 62 through shaft 63 and hollow shaft 61.

In FIG. 4 is shown at 66 the electrical cables and pneumatic tubing which goes into the vertical carriage 18. The space between the rotation drive tube 61 (FIG. 6) and the inside wall of the housing tube 17 acts as a conduit for the pneumatic tubes and electrical leads emerging from components mounted on the rotation mounting plate 60. These tubes and leads are coiled in helix fashion around the drive tube and emerge from the top end plate. This arrangement protects these tubes and leads from entanglement with operating components within the one turn movement in either direction of the $\theta$ axis. The electrical cabling on the cartesian coordinate axes, connected to the drive motors and encoders, is not shown in any of the figures.

Other features of one robotic assembly machine with 4 degrees of freedom and a 25 pound payload capability which was built and tested will be described briefly. The three linear movements are actuated by DC electric servo motors and ball nut lead screws. In the Y and X axis, motors are ironless disk rotor type with similar external tachometers, and directly drive the lead screws. To make optimum use of space and configuration, an iron rotor motor with an integral tachometer drives the Z axis screw nut through a 1:1 toothed belt coupling. The rotation axis is actuated by an electric disk motor with an integral tachometer through a 50:1 gear reduction. The X, Z, and $\theta$ drive motors are carried on moving carriages; this arrangement typically adds less than 10 percent to the carriage inertia while greatly simplifying the mechanical coupling between the drive source and the driven element. Rotary incremental encoders on all machine axes sense axis position. On the three linear axes, equivalent encoder resolution is 0.001 inch; on the rotation axis, resolution is 0.36 degrees. Encoders are mounted at the end of the lead screws on the Y and X axes, and on the motor output shafts on the Z and $\theta$ axes. Electronic devices sense the beginning and end of effective travel on all axes and a home position from which axes displacements are referenced. A small amount of overtravel beyond normal is provided at both ends of the three linear axes. In this region of operation, a resistor is switched across the drive motor for dynamic braking, and a hydraulic shock absorber (e.g., 67 in FIG. 5) is engaged to dissipate carriage energy. On the rotation axis, dynamic braking only is provided on over-travel.

The four electric motors are controlled by feedback servo control. The motor, tachometer, and encoder for each axis are coupled to form a closed loop servo control; the details of how this is done are understood by those skilled in the art. There are many commercially available controllers that may be used; one of these is the Anomatic II controller manufactured by Anorad Corp. Normally all four axes operate simultaneously to move to a given location, but since the axes are independent they may operate serially or in any combination.

The vertical Z movement can be used by itself for simple assembly tasks, with the rotation axis for more complicated tasks, or mounted on horizontal movements as shown in FIG. 5 to form an integrated robotic cartesian coordinate assembly machine. One embodiment of the robotic machine has only X, Y, and Z axes; this mechanism does not have the rotation axis. The machine configuration of this invention is not limited to the mounting arrangement shown in FIGS. 1-3 and 5. The machine can be supported in cantilever fashion for use over a conveyor line, or the defined X and Y axes can be operated in a vertical plane with the Z axis horizontal for special tasks. The three axes may be skewed with respect to one another and do not have to be mutually perpendicular. This versatility, along with the ability for each axis to be used as a module independent of the other axes, makes for a robotic machine configuration of great usefulness.

Two applications for the robotic machine are, with all four axes, to assemble fractional horsepower motors and, with only X, Y, and Z axes, to assemble wax pattern parts for turbine blade castings. The first is described in the inventor's U.S. Pat. No. 4,350,379 granted Sept. 21, 1982, "Universal Lifting Magnet", and in other pending applications. The second is described in abandoned continuation application Ser. No. 459,445 filed on Jan. 20, 1983, W. R. Potter, "Wax Bonding Using Hot Gas Jet". All of these are assigned to the assignee of this invention.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. A modular robotic assembly machine having three mutually perpendicular axes and a rotational movement about the third axis comprising:
   a first carriage supported on a frame, a second carriage supported on said first carriage, a third carriage supported on said second carriage, and drive means for moving said carriages linearly along the respective mutually perpendicular axes;
   said third carriage including an elongated tubular housing having end plates between which a non-rotating lead screw is fastened, a plurality of way rods on one of said second and third carriages and, on the other, linear bearings on which said way rods ride, said lead screw and way rods and bearings being exterior to said elongated housing;
   a rotation plate that is mounted on one end plate and has a central hole, and rotation drive means comprising a drive motor supported on the other end plate which is connected through an axial hollow shaft to said rotation plate;
   gripper means for performing automatic assembly tasks attached to said rotation plate, the space between said elongated housing and hollow shaft, and the inside of said hollow shaft, serving as a conduit for electrical leads and pneumatic tubes and to receive a power cylinder on said gripper means; and
   a stand which supports said frame and has a horizontal assembly table.

2. The robotic machine of claim 1 wherein said second carriage has a base plate and said first-mentioned drive means includes another drive motor on said base plate and a rotatable ball nut coupled by a belt drive to move said lead screw and third carriage.

* * * * *